United States Patent Office 2,861,993
Patented Nov. 25, 1958

2,861,993

2 DISUBSTITUTED AMINO METHYL CYCLO OCTANONE (1)

Otto Schlichting, Guenter Scheuerer, Franz Westphal, and August Amann, Ludwigshafen (Rhine), Germany, assignors to Badische Anilin- & Soda-Fabrik Aktiengesellschaft, Ludwigshafen (Rhine), Germany No Drawing. Application September 13, 1956
Serial No. 609,522

Claims priority, application Germany
September 28, 1955

6 Claims. (Cl. 260—247.7)

This invention relates to new cycloaliphatic aminoketones and to a process for producing them.

We have found that new cycloaliphatic aminoketones having valuable pharmacological properties are obtained by reacting cyclo-octanone with secondary amines and formaldehyde under the conditions of the so-called Mannich reaction.

Suitable secondary amines are for example dimethylamine, diethylamine, methyl-ethylamine, pyrrolidine, piperidine, hexamethyleneimine and morpholine. The amines are used in the form of their salts, for example their hydrochlorides, hydrobromides or sulfates.

The formaldehyde is used in aqueous solution or as paraformaldehyde.

The reaction, in the case of the use of cyclooctanone, formaldehyde and dimethylamine as initial materials, may be reproduced as follows:

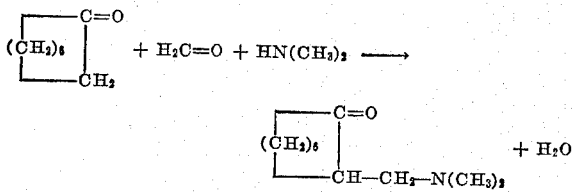

It is preferably carried out in the melt or in aqueous, alcoholic or aqueous-alcoholic solution. The new aminoketones often form sufficiently rapidly even at ordinary temperature; in general heating for instance to about 70° to 100° C., and an addition of somewhat more, for instance about 0.5 to 20 percent more than the stoichiometrical amount of a strong acid, such as hydrochloric, hydrobromic, sulfuric, phosphoric, toluenesulfonic or trichloroacetic acids, is necessary.

The new aminoketones are obtained in the form of salts which may be separated as such by evaporating the solvent and purified by recrystallization prior to setting free the basic aminoketones if desired by the addition of alkali. The crude reaction mixture may, however, be made alkaline and the aminoketones purified, for example by fractional distillation at reduced pressure.

The new cycloaliphatic aminoketones in general form in better yields than the corresponding aminoketones from cyclopentanone and cyclohexanone (see Mannich and co-workers, Ber. deutsch. Chem. Ges., 53 (1920), p. 1874, and Archiv d. Pharm., 276 (1938), p. 575). They are also considerably more stable so that many of them may be distilled at reduced pressure without decomposition.

While the free aminoketones are slightly soluble or insoluble in water, many of their salts, as for example the hydrohalides, acetates or oxalates, as well as their quaternization products, as for example iodomethylates or methosulfates, have good solubility in water. In the form of these water-soluble salts, the new cycloaliphatic aminoketones show analgesic properties, which are superior to those of the corresponding derivatives of cyclohexanone and cyclopentanone for the same toxicity.

The following table shows the minimum dose which is still analgesically active by oral administration:

| Hydrochloride of— | Effective minimum dosage in mg./kg. |
|---|---|
| 2-(dimethylaminomethyl)-cyclo-octanone-(1) according to this invention. | 100–150. |
| 2-(dimethylaminomethyl)-cyclo-hexanone-(1) as a comparison. | more than 400. |

The following examples will further illustrate this invention but the invention is not restricted to these examples. The parts are by weight.

Example 1

252 parts of cyclo-octanone are boiled under reflux with 81.5 parts of dimethylamine hydrochloride, 39 parts of paraformaldehyde and 320 parts of absolute ethyl alcohol for about 105 minutes. In the course of this time, 3 parts of concentrated hydrochloric acid are added a little at a time, a clear solution thereby being formed. After cooling, the alcohol is distilled off at reduced pressure. The precipitated hydrochloride is dissolved in the necessary amount of water; the solution is extracted with ether to remove excess cyclo-octanone, of which 110 to 115 parts are recovered. The acid, aqueous phase is made alkaline with potassium carbonate with the addition of a little caustic soda solution. The free keto base which separates is taken up in ether, washed with water and dried over calcined potassium carbonate. After evaporating the ether there are obtained 152 parts of 2-dimethylaminomethyl-cyclo-octanone-(1) which boils at 105° to 110° C. under a pressure of 8 torr.

The hydrochloride of this aminoketone melts at 138° to 139° C., and the iodomethylate at 182° to 184° C. The following substance are obtained by the same method:

(a) 178 parts of 2 - morpholinomethylcyclo - octanone-(1) which boils at 120° to 126° C. under a pressure of 0.2 torr from 252 parts of cyclo-octanone, 123 parts of morpholine hydrochloride and 39 parts of paraformaldehyde; the hydrochloride melts at 150° C. and the iodomethylate at 171° to 174° C.

(b) From 126 parts of cyclo-octanone, 19.5 parts of paraformaldehyde and 61 parts of piperidine-hydrochloride: 70 parts of 2-piperidinomethylcyclo-octanone-(1) of the boiling point 112° to 115° C. at a pressure of 0.2 torr. The hydrochloride melts at 155° to 156° C. and the iodomethylate at 126° to 128° C.

(c) From 252 parts of cyclo-octanone, 135 parts of hexamethylene imine hydrochloride and 39 parts of paraformaldehyde: 108 parts of 2-hexamethyleneiminomethyl-cyclo-octanone-(1) of the boiling point 121° to 124° C., at a pressure of 0.2 torr. The hydrochloride melts at 146° to 147° C. and the iodomethylate at 154° to 157° C.

(d) From 252 parts of cyclo-octanone, 110 parts of diethylamine hydrochloride and 39 parts of paraformaldehyde; 80 parts of 2-diethylaminomethylcyclo-octanone-(1) of the boiling point 78° to 84° C. at a pressure of 0.2 torr. The hydrochloride melts at 106° to 107° C.

(e) From 126 parts of cyclo-octanone, 54 parts of pyrrolidine hydrochloride and 19.5 parts of paraformaldehyde; 64 parts of 2-pyrrolidinomethylcyclo-octanone-(1) of the boiling point 106° to 111° C. at a pressure of 0.2 torr. The hydrochloride melts at 142.5° to 144° C. and the iodomethylate at 97° to 99.5° C.

Example 2

126 parts of cyclo-octanone are dissolved in 320 parts of absolute ethyl alcohol, then 81.5 parts of dimethylamine hydrochloride and 30 parts of paraformaldehyde are introduced and the whole heated for about 100 minutes to boiling under reflux, while during this time 3 parts of concentrated hydrochloric acid are added gradually. After cooling, the crude 2-dimethyl-aminomethyl-cyclo-octanone-(1) hydrochloride is precipitated from the clear alcoholic solution by the addition of absolute ether. By repeated precipitation of the alcoholic solution with ether there are obtained 186 parts of pure hydrochloride of the melting point 138° too 139° C.

*Example 3*

35 parts of cyclo-octanone are intimately mixed with 16 parts of dimethylamine hydrochloride and heated to a bath temperature of 60° C. 6 parts of paraformaldehyde are added to the fused mass and the bath temperature is raised to 90° C. In the course of 45 minutes, 10 drops of concentrated hydrochloric acid are introduced, a homogeneous melt being thereby formed. When the reaction has been completed, the water formed is removed at reduced pressure. The mass which solidifies when cooled is purified by dissolving it in absolute ethyl alcohol and precipitating it with absolute ether. 40 parts of 2-dimethylaminomethyl-cyclo-octanone-(1) hydrochloride of the melting point of 138° to 139° C. are obtained.

We claim:
1. 2-dimethylaminomethyl-cyclooctanone-(1).
2. 2-piperidinomethyl-cyclooctanone-(1).
3. 2-pyrrolidinomethyl-cyclooctanone-(1).
4. 2-diethylaminomethyl-cyclooctanone-(1).
5. 2-morpholinomethyl-cyclooctanone-(1).
6. Members of the group consisting of a cycloaliphatic aminoketone of the general formula

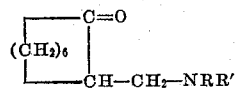

in which NRR' is a secondary amino radical selected from the group consisting of di-lower alkyl amino, pyrrolidino, morphonilo, piperidino, and hexamethylene-imino, and the hydrohalides, acetate, oxalate, iodomethylate and methosulfate of said aminoketone.

References Cited in the file of this patent

Mannich et al.: Ber. deutsch. Chem. Ges., vol. 53 (1920), page 1874.

Mannich: Archiv. d. Pharm., vol 276 (1938), page 575.